(12) United States Patent
Cable et al.

(10) Patent No.: US 8,289,504 B2
(45) Date of Patent: Oct. 16, 2012

(54) SHACK HARTMAN SENSOR WITH REMOVABLE LENSLET ARRAY

(75) Inventors: Alex E. Cable, Newton, NJ (US); Egbert Krause, Burgstaedt (DE); John Taranto, Oxford, NJ (US)

(73) Assignee: Thorlabs, Inc., Newton, NJ (US)

( * ) Notice: Subject to any disclaimer, the term of this patent is extended or adjusted under 35 U.S.C. 154(b) by 119 days.

(21) Appl. No.: 12/839,719

(22) Filed: Jul. 20, 2010

(65) Prior Publication Data

US 2011/0013178 A1 Jan. 20, 2011

Related U.S. Application Data

(60) Provisional application No. 61/226,821, filed on Jul. 20, 2009.

(51) Int. Cl.
*G01J 1/00* (2006.01)
(52) U.S. Cl. .................. 356/121; 356/122; 356/123
(58) Field of Classification Search .................. 356/121, 356/122, 123, 124, 125; 250/201.9, 208.1, 250/201.1
See application file for complete search history.

(56) References Cited

U.S. PATENT DOCUMENTS

| | | | | |
|---|---|---|---|---|
| 5,406,412 A | * | 4/1995 | Zehnpfennig et al. | 359/399 |
| 5,493,391 A | * | 2/1996 | Neal et al. | 356/121 |
| 5,629,765 A | | 5/1997 | Schmutz | |
| 5,748,827 A | | 5/1998 | Holl et al. | |
| 5,936,720 A | * | 8/1999 | Neal et al. | 356/121 |
| 6,515,810 B1 | | 2/2003 | Melford | |
| 6,565,209 B2 | * | 5/2003 | Campin | 351/212 |
| 6,572,230 B2 | * | 6/2003 | Levine | 351/221 |
| 7,078,665 B2 | * | 7/2006 | Topa | 250/201.9 |
| 7,646,544 B2 | * | 1/2010 | Batchko et al. | 359/665 |
| 2006/0186312 A1 | * | 8/2006 | Altman et al. | 250/201.9 |
| 2007/0273830 A1 | | 11/2007 | Levine | |
| 2009/0152453 A1 | * | 6/2009 | Li et al. | 250/235 |

FOREIGN PATENT DOCUMENTS

WO 98/18157 4/1998

OTHER PUBLICATIONS

International Search Report with Written Opinion for corresponding International Application No. PCT/US2010/042558, mailed Feb. 22, 2011.
Thorlabs: "Tools of the Trade", Thorlabs Catalogue, vol. 18, 2006, p. 82.
Partial International Search Report and Invitation to Pay Additional Fees for corresponding International Application No. PCT/US2010/042558, mailed on Nov. 8, 2010.

* cited by examiner

*Primary Examiner* — Sang Nguyen
(74) *Attorney, Agent, or Firm* — Graham Curtin, PA

(57) ABSTRACT

A Shack Hartmann ("SH") wavefront sensor comprising an optical device, such as a wave front dissector including a lenslet array, for transmitting, dissecting and focusing an incoming optical wave, an optical system, including, for example, an optical sensor, for receiving the transmitted incoming optical wave, and a removable kinematic mount for repeatable precision mounting of the optical device to the optical system.

18 Claims, 8 Drawing Sheets

SHACK HARTMAN SENSOR WITH REMOVABLE LENSLET ARRAY

CROSS-REFERENCE TO RELATED APPLICATIONS

This application claims the benefit of U.S. Patent Application 61/226,821 filed Jul. 20, 2009, the contents of which are incorporated by reference herein.

FIELD OF THE INVENTION

The present invention relates to sensors in general, and more particularly to a Shack Hartmann ("SH") Wavefront Sensor with a removable lenslet array. More particularly, this invention relates to means of removably and replaceably mounting a wave front dissector relative to a sensor such that the dissector is not permanently fixed in position relative to the sensor while maintaining precise relative alignment between the dissector and sensor, such that the precision and accuracy of the measured wave front for the combined dissector and sensor is not degraded relative to wave front sensors that permanently fix the dissector relative to the sensor.

BACKGROUND

A body in free space has six independent degrees of freedom, three translational, and three rotational, all typically defined with respect to a Cartesian coordinate system with the three translational degrees of freedom taking place along the three perpendicular axis of the Cartesian coordinate system, and the three angular degrees of freedom being defined as rotational degrees of freedom about the axis of the same system. The motion of a body in space can be described as a linear combination of these coordinates. In general each degree of freedom can be restrained with the appropriate placement of a point restraint on the body. A nearly ideal point restraint can be achieved using a high quality hardened steel ball bearing pressing against a polished sapphire plate that is optically flat (better than 0.25 microns) that is attached to the body being constrained. Within the field of opto-mechanical design the concept of a "kinematical design" is well known, here the designer is challenged to provide just one nearly ideal constraint for each of the six degrees of freedom that a body has in free space. Additionally a successful kinematic design is typically considered to be relatively independent of the structure being built but relies on the use of inexpensive mass produced parts such as precision hardened steel ball bearings and small optically polished sapphire plates to form a kinematic interface between moving or joined parts. The book "Building Scientific Apparatus" by John H. Moore et al describes the details of achieving a reasonable approximation to a kinematic design, see for example page 43 sections 1.6.1 and 1.6.2 of the 3rd addition. Here the authors describe how to achieve a kinematic design such that the resulting devices can be used in the very demanding application of optical assemblies where motion between parts of a fraction of a wavelength of light can be deleterious to the operation of the device. One such example is provided by Moore et al in FIG. 1.44 wherein a two plate kinematic device is illustrated, the device is designed to allow the two plates to come together stably such that the two plates when combined and lightly loaded together exhibit no extraneous motion between them. A number of companies sell opto-mechanical devices based on the principles thought by Moore et al, one such company is Thorlabs Inc of Newton N.J., their Kinematic Base Plate part number KB3X3 found in the Volume 19 version of the Thorlabs product catalog.

This KB3X3 device is advertised as providing micro-radian level repeatability in its rotational degrees of freedom after repeated removal and replacement of the top of the two part device. It is assumed that the bottom part of the device is securely fixed to a massively rigid structure, typically an optical table also sold by Thorlabs. The typical use of the Thorlabs device is to allow the user to build flexible optical systems with one use being the redirecting of a laser beam on an optical table from one experimental setup to another with a high degree of repeatability. To achieve this function a KB3X3 in located along the laser beam path, for this example assume an existing experiment lies a small distance in front of the source of the laser beam. Utilizing a kinematic mirror mount for example a Thorlabs KS1 along with an appropriate mirror, the mirror is mounted to the top plate of the KB3X3 using opto-mechanical holders well known within the field of optical sciences and also provided by Thorlabs. Once the mirror is appropriately affixed to the KB3X3 such that it redirects the laser beam, the user would then use the mirror mount controls to deflect the beam well away from the uninterrupted beam path to an unused portion of the optical table. Now the user can have the laser available for two experiments, by placing the top plate of the KB3X3 onto its base the beam is deflected precisely along the desired path to the unused portion of the optical table where a second experiment can be constructed. And by removing the top plate of the KB3X3 the undeflected beam is free to travel past the KB3X3 to serve the first application.

Various optical instruments require precise alignment of at least one optical element relative to another as discussed above, where the alignment tolerance determines the accuracy and precision of the instrument's measurements. One example of such an instrument is a SH Wavefront Sensor. SH Wavefront Sensors are capable of accurate measurements of an optical wave front's shape and intensity distribution by analyzing the location and intensity of spots (spot field) formed by imaging an incident light field onto a CCD (charge coupled device) camera, for example, via a lenslet array or a micro-lens array. To achieve sufficient measurement precision and accuracy, the lenslet array must be very precisely aligned relative to the CCD sensor. Typically the lenslet array is permanently fixed relative to the CCD to assure precise alignment over time. This limits the measurement to a maximum wave front slope, determined primarily by the pitch of the micro-lens array and the effective focal length of the micro-lens array. There would be a tremendous benefit to being able to change the micro-lens array in the field without requiring the user to perform a calibration procedure, while maintaining the measurement accuracy and precision of a SH sensor with a "fixed" micro-lens array.

SUMMARY

One embodiment of a system is disclosed for repeatedly precise positioning of one element, such as a lenslet array, with respect to a second element, such as a CCD array, or other optical subsystem, such that one element is removable and replaceable while maintaining sufficient alignment of the six degrees of freedom of the alignment so that no subsequent alignment or calibration is required.

DETAILED DESCRIPTION OF THE PREFERRED EMBODIMENTS

Figure 1:
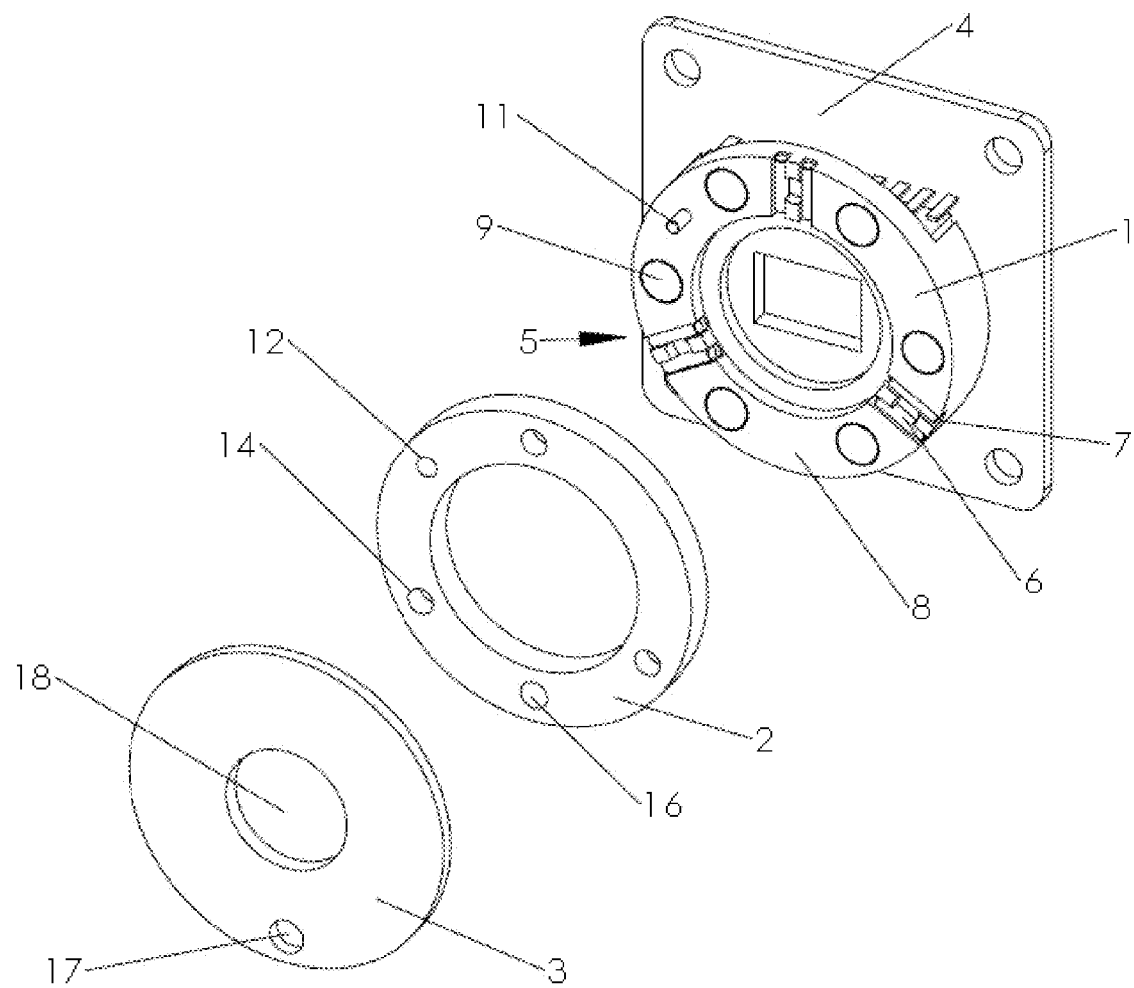
FIG. 1 is a front isometric, exploded view of one embodiment of a precision mount for a lenslet array in a CCD-based SH sensor including a base mounting plate mounted to a sensor, an intermediate plate and a wavefront dissector plate.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

FIG. 1 illustrates an exploded view of one embodiment of a SH sensor system of the invention comprising three separate plates, namely a base mounting plate 1, an intermediate plate 2, and a wave front dissector plate 3. Base mounting plate 1, which is positioned adjacent and preferably mounted to a CCD sensor or the like 4, preferably includes three reference alignment regions 5, each formed by a pair of radially-arranged, spaced-apart and preferably parallel dowel pins 6. The mechanical axis of each parallel dowel pin pair is defined as being in the plane created by the mechanical axis of each dowel pin 6 and equidistant to each dowel pin's mechanical axis. The mechanical axes of the dowel pins 6 in this embodiment are in a common plane, and the mechanical axis of each dowel pin pair is disposed at equal angles. The dowel pins 6 are pressed into machined grooves 7, whose separation tolerance is preferably within approximately 0.001 inches (although other values are contemplated) and whose depth is such that the dowel pin axes are set to a prescribed distance below surface 8 of base plate 1 to assure that the dowel pins 6 are securely fixed in position and do not require the need of an adhesive, or other mechanical fastener.

In the present embodiment, pairs of magnets 9 in base plate 1 are positioned such that there is one magnet 9 on each side of each dowel pin pair. The magnets 9 are oriented such that their magnetic poles are aligned in the same direction and attract oppositely-disposed magnets 10 (FIGS. 2, 4) on intermediate plate 2. An alignment pin 11 extends outwardly from base plate 1 to mate with an alignment hole 12 in intermediate plate 2 to assure the rotational alignment during the engagement of base plate 1 with intermediate plate 2, while the interaction of the magnets 9, 10 draws the plates 1, 2 together as will be described below. In an alternate embodiment (not shown), rotational alignment of base plate 1 with intermediate plate 2 could occur by manipulating the polarity of the magnet pairs 9, 10 such that the polarity of the magnets might differ along the base plate 1 for example, such that the plates 1, 2 would only coaxially and rotationally engage upon a certain angular orientation of the plates 1, 2, otherwise the plates would not engage and/or repel each other.

Figure 2:
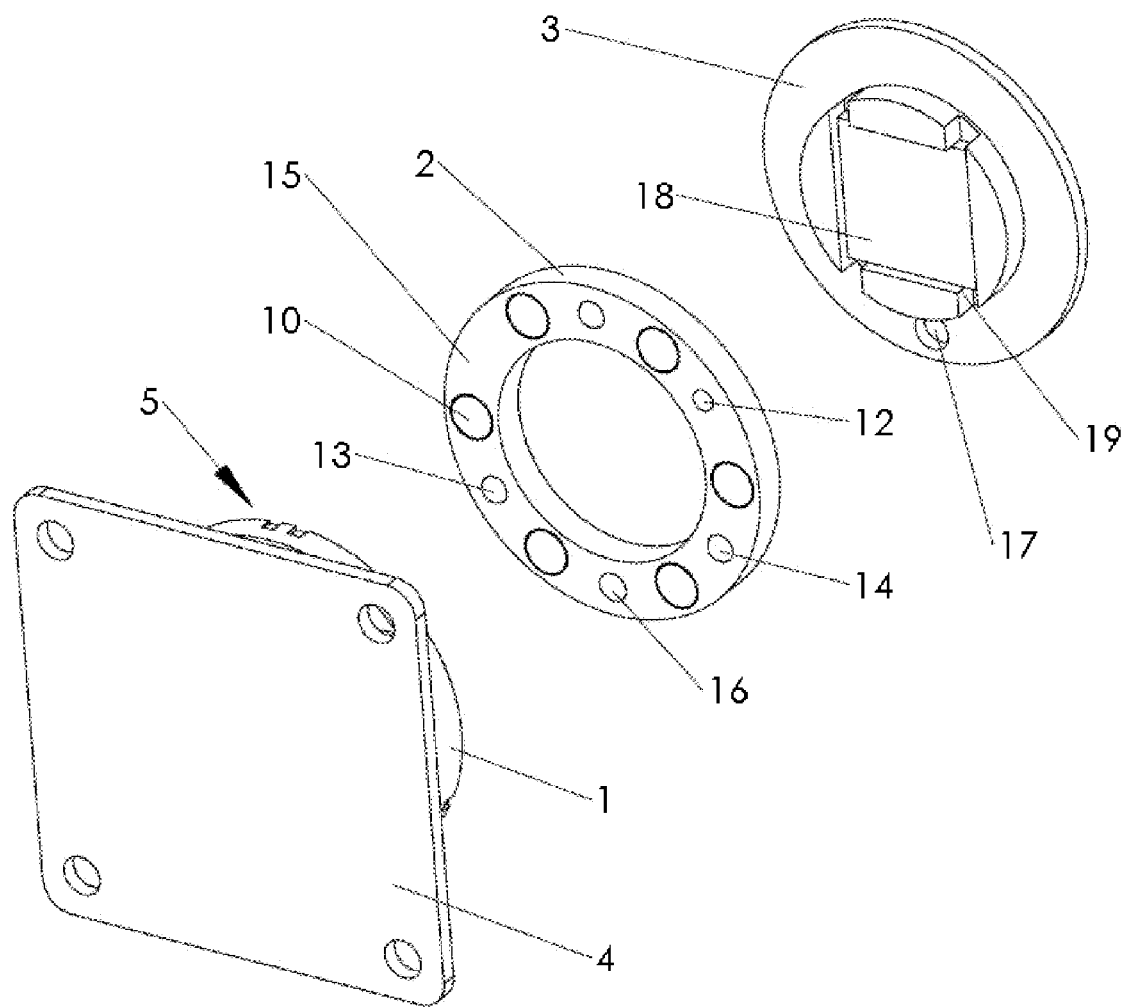
FIG. 2 is a rear isometric, exploded view of the embodiment of a precision mount of FIG. 1.

FIG. 2 is a rear isometric view of the mount of FIG. 1. Three hardened balls 13 disposed within pockets 14 (see also FIG. 1) are situated on a mating surface 15 of intermediate plate 2, such that the location of the balls 13 correspond with the reference alignment regions 5 on base plate 1. The balls 13 are preferably pressed into precisely positioned mounting holes or pockets 14 in plate 2 using manufacturing fixtures, such that they extend outwardly at precise distances from mating surface 15. An alternate embodiment (not shown) would allow for individual adjustability of each ball position, such as through the use of integrated adjustment screws, prior to being affixed in position. These mating balls 13 and dowel pin pairs 6 form a kinematic mounting seat that enable base plate 1 and intermediate plate 2 to repeatedly be engaged and disengaged, such that each time the plates are engaged the change in position of one plate with respect to the other is negligible from one engagement to the next. In addition, the embodiment of the present arrangement allows a user to vary, change and interchange dissector plates relative to the sensor in the event it is desired to, for example, change the distance between the dissector plate and the sensor depending on the specific environment or operating conditions. Thus, a user can be provided with a system, for example, comprising a single sensor mounted to a base plate and a plurality of interchangeable dissector mounts each mounted to intermediate plates (as shown, for example, in FIGS. 3 and 4) that are designed to mate with the base plate as described herein. It is preferred, in such an example, that each interchangeable dissector mount is calibrated with the base plate, where such calibration could occur at the manufacturer's location. During this calibration various optical parameters of the dissector, such as, but not limited to, focal distance and inter-lens distances, relative to the sensor are measured and saved so that these parameters can be used by a software application that uses the sensor data to calculate the wave front incident on the dissector.

The three paired pressed dowel pin pairs 6 and three hardened balls 13 are one embodiment of a kinematic seat, in which each ball makes two points of contact with each dowel pin pair 6 for a total of six constraining points, one per degree of freedom. Reference the book titled *Building Scientific Apparatus*, by John H. Moore, et al. Of course, it will be understood that while the illustrated embodiments show the dowel pin pairs 6 on the base plate 1, and the hardened balls 13 on the intermediate plate 2, it will be appreciated that the dowel pin pairs 6 could be on the intermediate plate 2, and the hardened balls 13 could be on the base plate 1, as the case may be. Alternatively, the base plate 1 could have a mix of dowel pin pairs and balls that cooperatively mate with a similar mix on the intermediate plate, as long as the kinematic mounting relationship between the two plates is maintained. Furthermore, it will be appreciated that various kinematic arrangements other than that shown in the present embodiments are contemplated, such as a standard kinematic mount where one ball contacts a conical or pyramid-shaped hole, another ball contacts a v-groove and the third ball rests on a flat surface.

To reliably hold intermediate plate 2 in position relative to base plate 1, magnets 9, 10 are strategically mounted in the plates as initially discussed above. The size and strength of the magnets are selected to assure the engaged plates do not move with respect to each other during normal handling and use. However, the combined forces between the opposing magnets are preferably strong enough such that it would not be difficult to remove the base plate 1 from intermediate plate 2 using solely finger strength. In the embodiment shown in FIGS. 1 and 2, a threaded hole 16 in intermediate plate 2 allows one to use a tool (not shown), such as a screw for example, to assist with the disengagement of the joined plates 3 and 2 with base plate 1 to the extent that it is difficult to obtain a finger purchase on the plates 2, 3. More specifically, a through-hole 17 is strategically located in the wave front dissector plate 3 that provides access through the plate 3 to the threaded hole 16 or the like in intermediate plate 2. A tool, such as a screw (not shown), is inserted through the through-hole 17 and into the threaded hole 16 and thereafter functions as a handle for gripping the plates 2 and 3 through the engagement of the tool with the threaded hole 16 and further functions as a lever for assisting with the separation of the base plate from the intermediate plate 2. The tool may be removed after disengagement of the plates 1, 2, or the tool may reside in the threaded hole 16 in preparation for re-engagement of the plates 2, 3 with the base plate 1 or a different base plate (not shown) in another system (not shown). In an alternate embodiment (not shown), two or more holes could be positioned on the plates 2, 3 to assist in the disengagement of the plates 1, 2.

Figure 3:
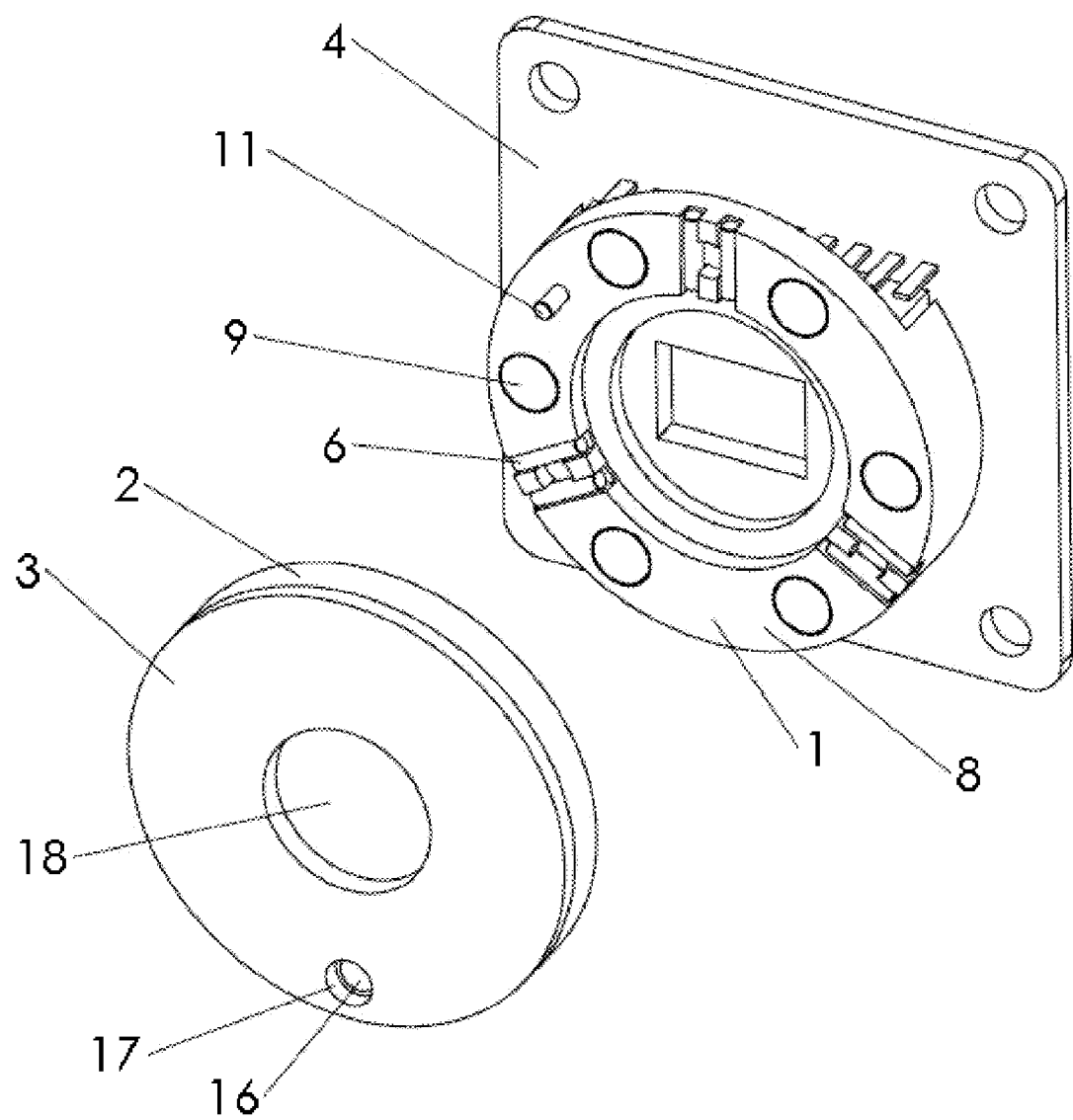
FIG. 3 is a front isometric, partially exploded view of the embodiment of the precision mount of FIG. 1 with the intermediate plate mounted to the wave front dissector plate.
Figure 4:
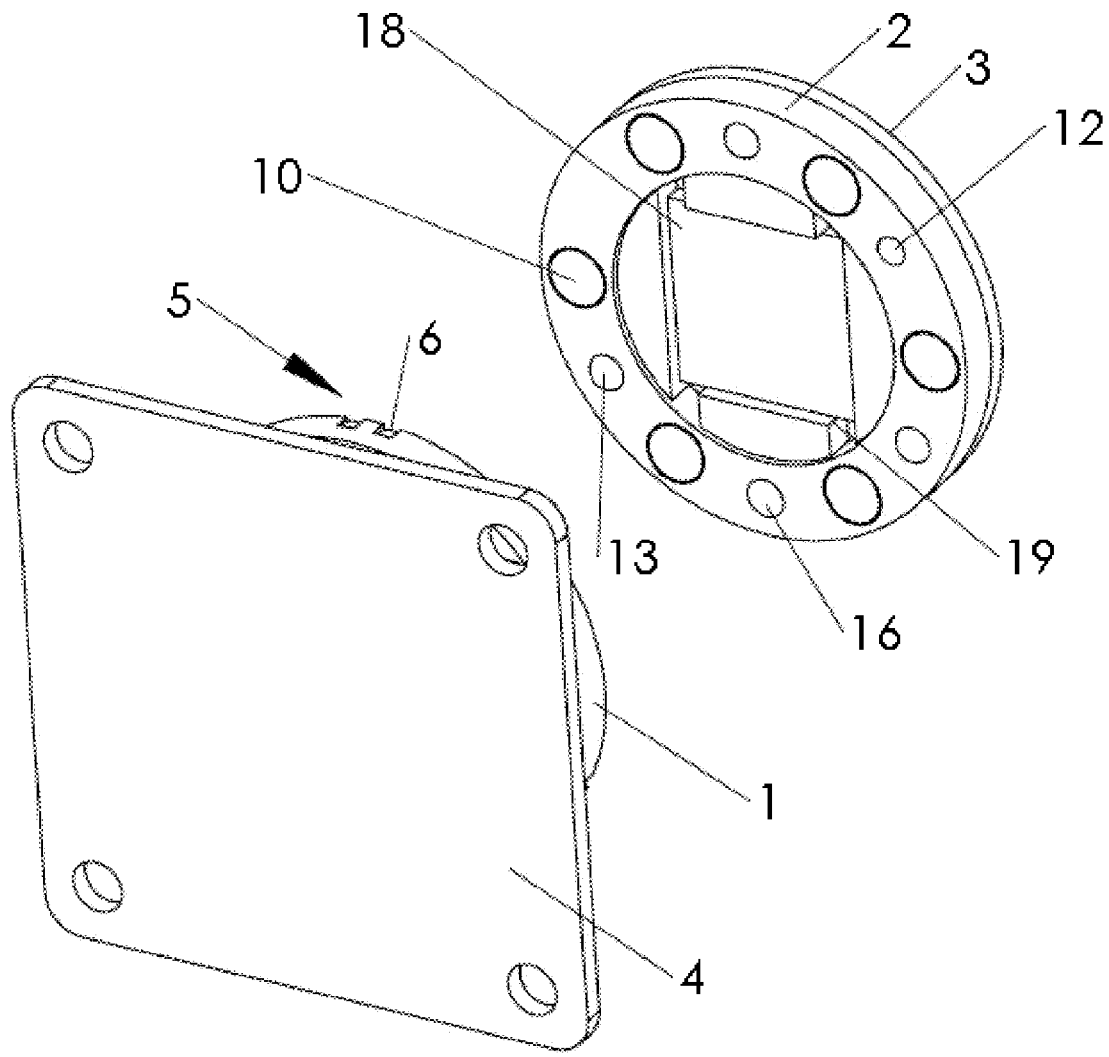
FIG. 4 is a rear isometric, partially exploded view of the embodiment of the precision mount of FIG. 3.

Intermediate plate 2 and wave front dissector plate 3 are aligned separately from base plate 1. A precision manufacturing fixture is used to permanently affix plates 2 and 3 together as shown in FIGS. 3 and 4.

In the embodiment of FIGS. 1-4, a wave front dissector 18 is preferably permanently mounted in plate 3 using adhesive or other means known in the art to assure the proper alignment of the dissector 18 with respect to the dissector mount. Plate 3 is designed such that the wave front dissector 18, specified to be square for this embodiment, sits in a square well 19. Intermediate plate 2 and dissector plate 3 are aligned separately from base plate 1. More specifically, a precision manufacturing fixture is used to permanently affix plates 2 and 3 together.

The design and assembly of manufacturing fixtures significantly contribute to enable the assembly of the removable subassemblies (elements 2, 10, 13, 3, 18) to properly mate with base plate subassemblies (elements 1, 6, 9, 11). One manufacturing fixture is used to precisely align the six degrees of freedom of the base plate subassembly's reference plane, defined as the plane that includes the mechanical axes of the dowel pins 6, with respect to the sensor 4, and maintain the alignment while the sensor and the base plate subassembly are permanently affixed. A separate manufacturing fixture is used to align and set the removable subassemblies' reference plane, defined as the plane created by the centers of balls 13, relative to a surface of the wave front dissector 18, as well as the angular alignment of the wave front dissector 18 relative to the orientation of the balls 13.

Alternatively, in case of such an absolute alignment of the mating plane isn't required, the precision six-axis alignment of base plate 1 to the sensor 4, such as a CCD array, can be simplified to a single rotational adjustment and dissector plate 3 is aligned when intermediate plate 2 is already mated with base plate 1 using manufacturing fixtures.

Figure 5:
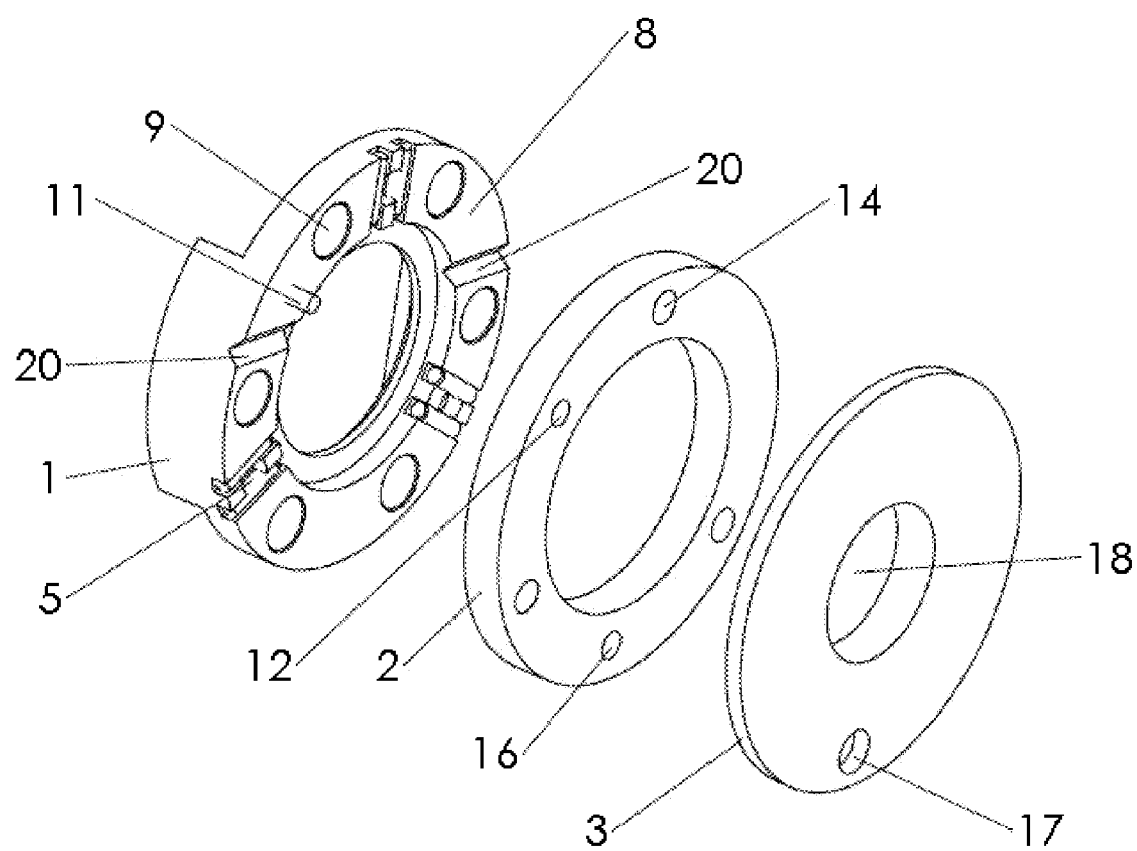
FIG. 5 is a front isometric, exploded view of one embodiment of a precision mount for a lenslet array in a CCD-based SH sensor (sensor not shown) including a base mounting plate, an intermediate plate and a wavefront dissector plate.

In the embodiment of FIGS. 1 through 4, base plate 1 is preferably permanently affixed to a sensor 4, such as a CCD array. This can be done using an adhesive or other means known in the art. FIG. 5 illustrates one embodiment of the assembly of FIG. 1 with the sensor not shown attached to the base plate 1. A groove 20, shown in the embodiment of FIG. 5 just below the alignment pin 11, although this location is not critical, is used to align base plate 1 with respect to the sensor 4 (not shown in FIG. 5) prior to it being affixed to the base plate 1. A rod (not shown), or other such straight element, for example, can be set in the groove 20 to cast a shadow on the sensor 4, which can be actively sensed with the sensor 4. In the case of a CCD sensor, the groove 20 would be designed into base plate 1 such that the shadow of the rod, or other straight element, is aligned with a row, or column, of the sensor 4, allowing fine rotational alignment of the base plate 1 relative to the sensor 4. The groove 20 is also preferably positioned on the base plate 1 such that the utilized straight element would not interfere with the alignment regions 5.

Thus, what is described here is one embodiment of a means for precisely positioning a wave front dissector, such as a lenslet array 18, in front of a sensor 4, such as a CCD sensor. This means for positioning addresses six degrees of alignment adjustment: two transverse alignments (in the plane of the sensor) through the use of the balls 13, longitudinal alignment (orthogonal to the sensor) through the use of the ball geometry and the relative orientation of the dowel pins within the pin pairs, rotational alignment about an axis orthogonal to the sensor through the interaction of the balls and the dowel pin pairs, and rotational alignments about two orthogonal axes that are each orthogonal to the prior rotational axis again through the interaction of the balls and the dowel pin pairs. Additionally, the positioning means does not permanently mount the dissector relative to the sensor, but instead allows for the dissectors to be replaced or interchanged with another dissector by the user, while precisely holding the position of the integrated dissector relative to the sensor such that the accuracy and precision of the wave front measurements is not degraded in comparison to measurements made with wave front sensors that permanently mount the dissector relative to the sensor.

Figure 6:
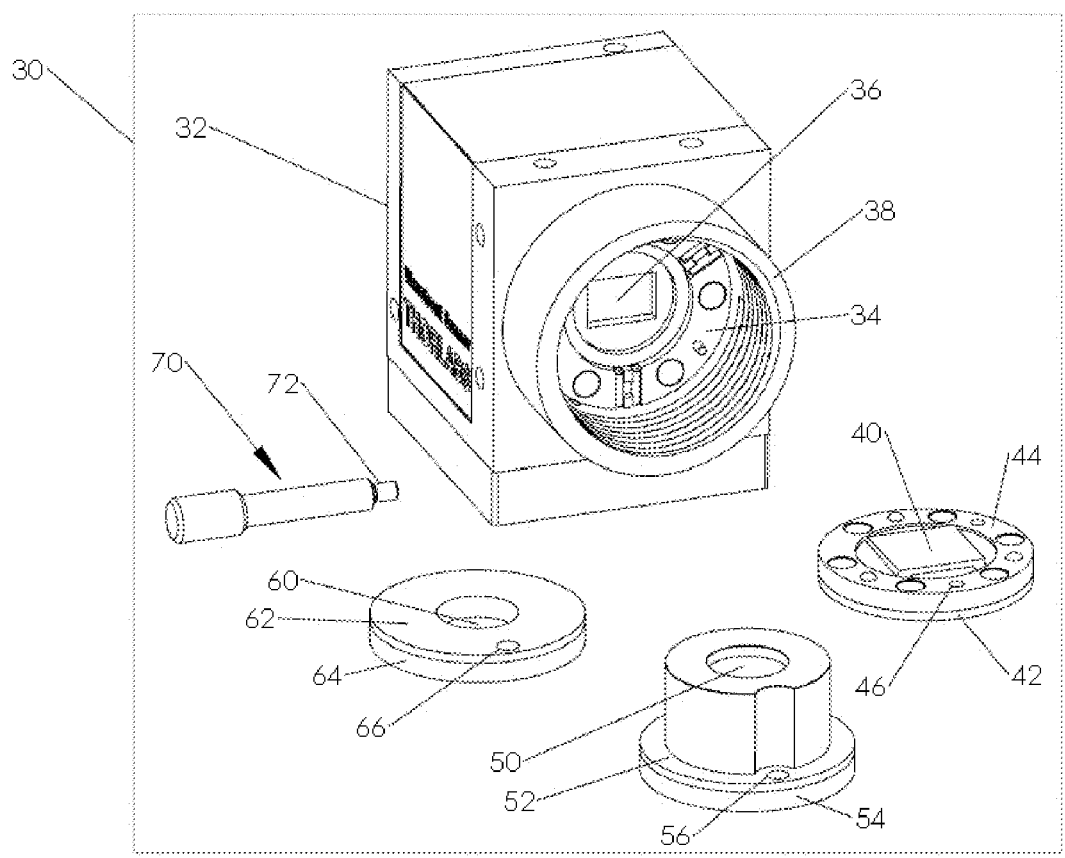
FIG. 6 illustrates one embodiment of a kit including a SH sensor, a plurality of microlens arrays and a tool.

FIG. 6 illustrates one embodiment of a kit 30 including a SH sensor system 32 defined by a base plate 34 associated with a sensor 36 (such as a CCD camera, for example), an intermediate plate 44, and a wavefront dissector 40 such as a microlens array housed in a wavefront dissector plate 42, for example. Additional wavefront dissectors 50 and 60, for example, can be provided in the kit 30 and/or vended separately for use with the SH sensor system 32, wherein each wavefront dissector, when associated with the SH sensor system 32, may exhibit a different optical characteristic relative to the sensor 36 including, but not limited to, focal length or lens pitch. For example, wavefront dissector 50 is positioned further away from the intermediate plate 54 that engages with the base plate 34 as compared with the position of the wavefront dissector 40 relative to its intermediate plate 44, and therefore the wavefront dissector 50 exhibits a greater focal length as compared with the focal length of wavefront dissector 40 or wavefront dissector 60. Similarly, while wavefront dissectors 40 and 60 may have the same focal length, one wavefront dissector may have a different lens pitch. Accordingly, various wavefront dissectors may be provided that exhibit differing optical characteristics or features that would be beneficial in a given environment or application.

Figure 7:
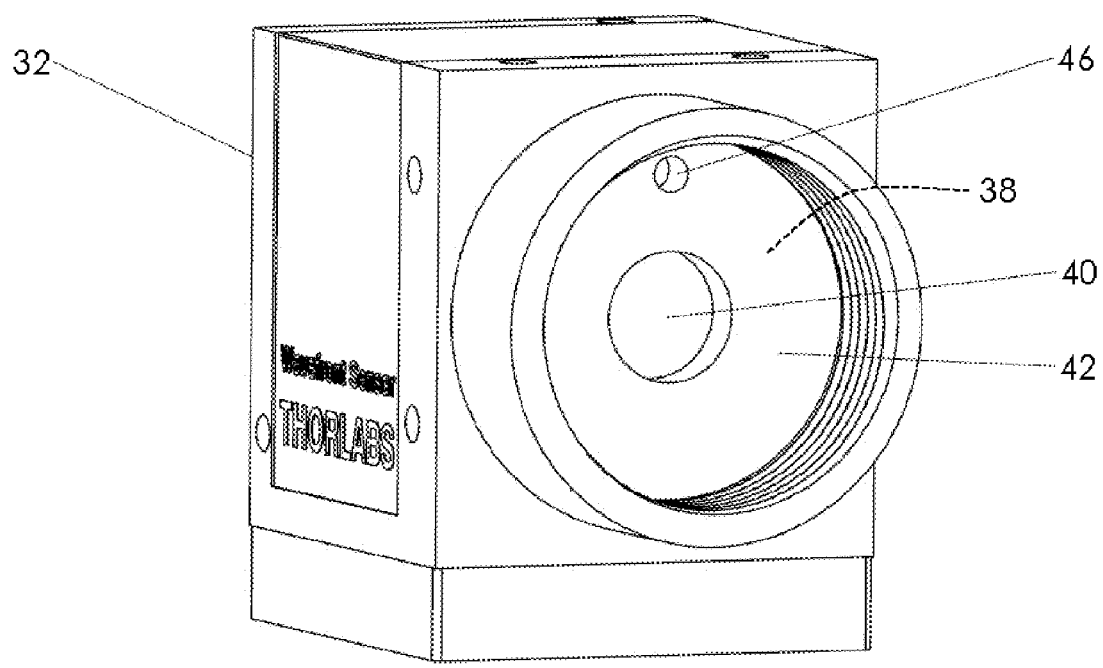
FIG. 7 illustrates one embodiment of an assembled SH sensor system.

Also provided in the kit 30 of FIG. 6 is a tool 70 having an engagement end 72 for assisting with the engagement and disengagement of the various microlens arrays 40, 50, and 60 with the base plate 34. Specifically, the engagement end 72 of the tool 70 is securely engageable with the openings 46, 56, and 66 provided in the intermediate plates 44, 54, and 64 associated with the wavefront dissectors 40, 50 and 60 respectively to maneuver such wavefront dissectors with intermediate plates through the mount 38 provided on the face of the system 32 (see also the above discussion of the engagement of a tool with through holes 16 and 17 shown, for example, in FIGS. 1 and 3). FIG. 7 illustrates the SH sensor system 32 with wavefront dissector 40 and dissector plate 42 mounted to the base plate 34. The mount 38 is preferably threaded to accommodate filters (not shown) to help prevent the saturation of the sensor pixel provided in the sensor 36 and lens tubes to reduce scattered light and to allow for the mounting of additional optical components (not shown). The exchange of wavefront dissectors such as microlens arrays allows for economic switching to different applications requiring different wavefront sensor specifications in terms of spatial resolution (lenslet pitch), focal length, wavefront sensitivity and dynamic range. Each microlens array mounted in a wavefront dissector plate can be interfaced with the same base plate 34 and sensor 36. In one example, one microlens array might comprise a chrome mask microlens array, which prevents light from passing between the microlenses. The chrome mask considerably increases the intensity of the back reflection from the surface of the microlens array however, it can be used over a broad operating wavelength range (300-1100 nm). Other microlens arrays could be AR-coated (400-900 nm) and are suitable for applications that are sensitive to back reflections. Other microlens arrays are possible. Each microlens array may be pre-mounted to a dissector plate and calibrated relative to the sensor, or it may be provided un-mounted and require mounting to a dissector plate and calibration relative to a sensor.

Figure 8:
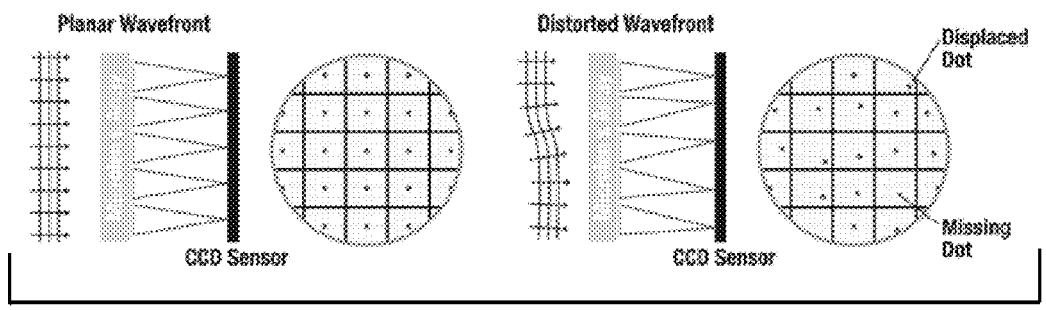
FIG. 8 illustrates how a SH wavefront sensor works.
Figure 9:
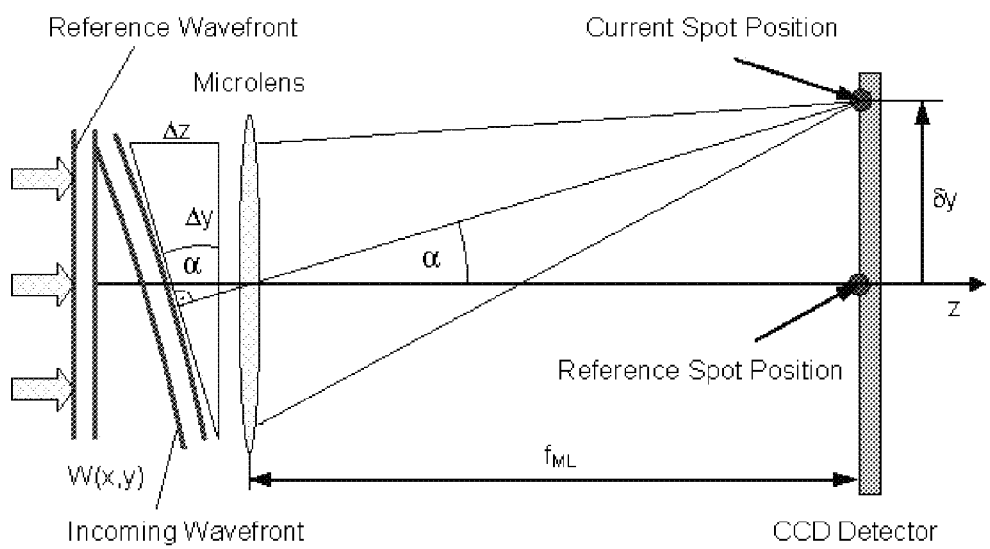
FIG. 9 illustrates wavefront distortion and spot displacement in a SH wavefront sensor.

FIGS. 8 and 9 illustrates the general functional principle behind a SH sensor, which consists basically of an optical sensor, such as a CCD camera, with a microlens array mounted in a defined distance in front of its sensor chip. Each microlens generates a spot onto the sensor whereas the spot centroid position depends on the wavefront gradient in front of the lens area. Each microlens of the lenslet array collects the light falling onto its aperture and generates a single spot on the detector plane (CCD camera) that is situated a focal length behind the lenslets. The spot positions are straight behind the lenses, on the optical axis or each lens, only in the case that the launched wavefront is planar and parallel to the plane of the lenslets. These are termed Reference Spot Positions or Reference Spotfield. In the common case however, the current spot positions will be deviated in X and, or, Y direction, that is, every spot will lie away from the optical axis Z of its associated microlens, separated by an angle α.

With reference to FIG. 9, it can be shown that this is caused by an incoming wavefront with the same average angle α compared to the reference wavefront.

$$\tan \alpha = \Delta z/\Delta y = \delta y/f_{ML}$$

When W(x,y) describes the shape of the wavefront so its partial derivation relative to x and y are determined by the spot shift δx and δy, respectively as well as by the distance between microlens end detector which is usually the focal length of the microlens $f_{ML}$.

$$\partial/\partial x \cdot W(x,y) = \delta x/f_{ML} \quad \partial/\partial y \cdot W(x,y) = \delta y/f_{ML}$$

Spot deviations δx and δy are determined by calculating the centroid coordinates of all detectable spots and subtracting the corresponding reference coordinates afterwards. These spot deviations are integrated within a 2-dimensional integration process that gives the wavefront W (x,y).

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A Shack Hartmann ("SH") wavefront sensor comprising:
   a) an optical wave front dissector for dissecting an incoming optical wave;
   b) an optical system for detecting the dissected incoming optical wave; and
   c) a removable kinematic mount for repeatable precision mounting of the optical wave front dissector to the optical system;
   wherein the removable kinematic mount further comprises a base member mounted to the optical system, a mating member mounted to the optical wave front dissector, a plurality of balls on one of the base member and the mating member, and a plurality of ball seats on the other member.

2. The sensor of claim 1, wherein each ball seat further comprises a plurality of spaced-apart, radially-extending dowel pins that form a dowel pin pair.

3. The sensor of claim 2, further comprising a recessed ball pocket disposed between each dowel pin pair.

4. The sensor of claim 3, wherein each dowel pin pair is partially recessed within an outer surface of one of the base member and the mating member, and each ball is partially recessed within the other member.

5. The sensor of claim 4, further comprising a plurality of magnets disposed on each of the base and mating members that attract the base and mating members together.

6. The sensor of claim 5, further comprising a pair of magnets disposed around each dowel pin pair.

7. The sensor of claim 6, wherein at least two magnets on the base member have opposite polarities.

8. The sensor of claim 5, wherein each magnet on the base member has the same polarity and each magnet on the mating member has an opposite polarity from that of the base member.

9. The sensor of claim 1, wherein the optical system is a CCD (charge coupled device) camera.

10. The sensor of claim 1, wherein the optical wave front dissector further comprises a lenslet array.

11. The sensor of claim 1, further comprising an orthogonal alignment member extending outwardly from one of the base member and the mating member.

12. The sensor of claim 11, further comprising an alignment opening in the other member that is adapted to receive the orthogonal alignment member.

13. The sensor of claim 1 further comprising a groove disposed in the base member for receiving a calibration member for rotational alignment of the base member with the optical system.

14. The sensor of claim 1, the mating member further comprising a tool access for accommodating a tool used to disengage the mounting member from the base member when such base and mounting members are engaged.

15. The sensor of claim 1, wherein the optical wave front dissector is mounted to an optical device support that is further mounted to the mating member.

16. A Shack Hartmann wavefront sensor system comprising:
   a) a first wave front dissector for dissecting an incoming optical wave;

b) an optical system for receiving the dissected incoming optical wave;
c) a first optical characteristic defined between the first wave front dissector and the optical system; and
d) at least one other wave front dissector that is interchangeable with the first wave front dissector for dissecting an incoming optical wave and defining a second optical characteristics between the at least one other wave front dissector and the optical system;
e) each wave front dissector being removably and kinematically mountable to the optical system a removable kinematic mount;

wherein the removable kinematic mount further comprises a base member mounted to the optical system, a mating member mounted to the optical wave front dissector, a plurality of balls on one of the base member and the mating member, and a plurality of ball seats on the other member.

17. The sensor system of claim 16, wherein the first and second optical characteristics are different focal lengths.

18. The sensor system of claim 16, wherein the first and at least one other wave front dissector each include a lenslet array, and wherein the first and second optical characteristics are different lens pitches of each lenslet arrays associated with each wave front dissector.

* * * * *